United States Patent
Ma et al.

(10) Patent No.: US 12,436,072 B1
(45) Date of Patent: Oct. 7, 2025

(54) MICRO-NANO IMPACT INDENTATION TESTING DEVICE AND METHOD BASED ON CYCLIC REFRIGERATION

(71) Applicant: JILIN UNIVERSITY, Changchun (CN)

(72) Inventors: Zhichao Ma, Changchun (CN); Zixin Guo, Changchun (CN); Guoxiang Shen, Changchun (CN); Jiazheng Sun, Changchun (CN); Wei Zhang, Changchun (CN); Hongcai Xie, Changchun (CN); Shuai Tong, Changchun (CN); Junming Xiong, Changchun (CN); Wenyang Zhao, Changchun (CN); Yicheng Li, Changchun (CN); Boyi Kou, Changchun (CN); Zaizheng Yang, Changchun (CN); Chaofan Li, Changchun (CN); Jiakai Li, Changchun (CN); Hongwei Zhao, Changchun (CN); Luquan Ren, Changchun (CN)

(73) Assignee: JILIN UNIVERSITY, Changchun (CN)

( * ) Notice: Subject to any disclaimer, the term of this patent is extended or adjusted under 35 U.S.C. 154(b) by 0 days.

(21) Appl. No.: 18/779,636

(22) Filed: Jul. 22, 2024

(30) Foreign Application Priority Data

Jul. 1, 2024 (CN) .......................... 202410866866.4

(51) Int. Cl.
*G01N 3/317* (2006.01)
*G01N 3/04* (2006.01)
*G01N 3/06* (2006.01)

(52) U.S. Cl.
CPC ............... *G01N 3/317* (2013.01); *G01N 3/04* (2013.01); *G01N 3/068* (2013.01);
(Continued)

(58) Field of Classification Search
CPC .......... G01N 3/317; G01N 3/068; G01N 3/04; G01N 2203/0224; G01N 2203/0051;
(Continued)

(56) References Cited

U.S. PATENT DOCUMENTS

| 11,635,361 B2 * | 4/2023 | Zhao ......................... G01N 3/08 73/800 |
| 12,247,956 B1 * | 3/2025 | Ma ......................... G01N 3/317 |
| 2021/0012384 A1 | 1/2021 | Kilmer et al. |

FOREIGN PATENT DOCUMENTS

| CN | 104697872 A | 6/2015 |
| CN | 106404574 A | 2/2017 |

(Continued)

*Primary Examiner* — Jonathan M Dunlap
(74) *Attorney, Agent, or Firm* — Birchwood IP (57) ABSTRACT

The present invention provides a micro-nano impact indentation testing device and method based on cyclic refrigeration, and relates to the technical field of material property testing. The testing device comprises a pressure rod and a stage for low-temperature micro-nano impact indentation testing, and a refrigeration device for refrigerating and cooling the pressure rod and the stage, wherein the refrigeration device refrigerates the pressure rod and the stage by adopting an embedded channel, a cold conduction wire connected to the pressure rod and the stage and a refrigeration balancer in contact with the cold conduction wire are arranged between the pressure rod and the stage, and the temperature of the pressure rod and the temperature of the stage are stabilized at a common temperature point by the cold conduction wire and the refrigeration balancer together.

9 Claims, 9 Drawing Sheets

(52) U.S. Cl.
CPC .............. *G01N 2203/001* (2013.01); *G01N 2203/0051* (2013.01); *G01N 2203/0224* (2013.01); *G01N 2203/0228* (2013.01); *G01N 2203/0641* (2013.01)

(58) Field of Classification Search
CPC ... G01N 2203/0641; G01N 2203/0228; G01N 2203/001
See application file for complete search history.

(56) References Cited

FOREIGN PATENT DOCUMENTS

| | | | | |
|---|---|---|---|---|
| CN | 118067538 A | | 5/2024 | |
| CN | 118111838 A | | 5/2024 | |
| CN | 118746371 A | * | 10/2024 | ............... G01K 1/00 |

* cited by examiner

MICRO-NANO IMPACT INDENTATION TESTING DEVICE AND METHOD BASED ON CYCLIC REFRIGERATION

CROSS-REFERENCE TO RELATED APPLICATIONS

This application claims priority to Chinese Patent Application No. 202410866866.4, filed on Jul. 1, 2024, which is hereby incorporated by reference in its entirety.

TECHNICAL FIELD

The present invention relates to the technical field of material property testing, and specifically to a micro-nano impact indentation testing device and method based on cyclic refrigeration.

BACKGROUND

Impact indentation is an experimental method used to measure the local mechanical properties of materials under high-speed dynamic loads, and is particularly suitable for studying the behavior of materials under high strain rate conditions, such as automobile collisions, space launches, supersonic aircraft, high-speed forming processes, and military protection. An upper limit of the strain rate of the traditional static or quasi-static indentation testing technology is relatively low and usually does not exceed $10^{-1}$ $s^{-1}$, which makes it difficult to meet requirements for evaluating dynamic response. Therefore, impact indentation technology emerges, which can provide a higher strain rate range, usually reaching above $10^3$ $s^{-1}$ or even higher, to simulate the dynamic loading effects under real conditions. The conventional impact indentation technology generally focuses on dynamic mechanical behavior at room temperature or higher temperatures. The physical and mechanical properties of the materials can be significantly changed at low temperature, such as increased brittleness and reduced toughness, which are important for the application of the materials in extreme environments. Accordingly, the present invention aims to provide a rapid, efficient and stable low-temperature loading environment for a micro-nano impact indentation testing device, and to obtain the service performance of materials under extreme conditions of coupling of impact indentation and low-temperature environment.

In the field of material micromechanical property testing, many scholars have studied low-temperature static nanoindentation devices and achieved some results. However, there are few studies on the low-temperature loading of a micro-nano impact indentation testing device. Currently, a refrigeration system aiming at low-temperature nanoindentation is mostly atmosphere refrigeration, which, combined with a commercial liquid nitrogen Dewar flask, requires a large and heavy atmosphere chamber. This refrigeration system is difficult to integrate various in-situ monitoring methods, and has high a requirement for a placement site, a sample size and energy consumption. Moreover, this refrigeration system often finds it difficult to accurately cool an indenter and a sample at the same time. The temperature difference between the indenter and the sample causes a "temperature drift" phenomenon, which will restrict the test precision.

In conclusion, to address the problem of the lack of testing means for the micromechanical behavior of functional and structural materials under the coupling of impact indentation and low-temperature environment, the construction of the service performance conditions of materials under extreme conditions of coupling of impact indentation and low-temperature environment is beneficial to the further development of energy, power, aerospace and other fields. Therefore, it is necessary to design and develop a refrigeration device suitable for a micro-nano impact indentation testing device, which can achieve continuous temperature change and coordinated refrigeration and is easy to integrate with various monitoring means.

SUMMARY

In view of the above, the present invention aims to provide a micro-nano impact indentation testing device and method based on cyclic refrigeration, which achieves accurate observation and research on the microscopic impact mechanical properties of a material under the extreme condition of low temperature by performing cyclic refrigeration on a pressure rod and a stage for impact indentation testing.

To solve at least one of the above technical problems, the present invention provides technical solutions as follows.

Provided is a micro-nano impact indentation testing device based on cyclic refrigeration, which comprises a linear motor, a drive platform, a piezoelectric stack, a pressure rod, an infrared thermal imaging assembly, a stage, a sliding table and a refrigeration device, wherein, the drive platform is arranged on the linear motor and can move towards the stage under the driving of the linear motor; the drive platform is further provided with a hinge base, the hinge base is provided with the piezoelectric stack and the pressure rod which are connected, a tip end of the pressure rod is provided with a diamond indenter, so that the pressure rod and the diamond indenter can move towards the stage under the push of the piezoelectric stack, and a force sensor is arranged between the pressure rod and the piezoelectric stack and used to obtain a pushing force applied by the piezoelectric stack to the pressure rod;

the stage is arranged on the sliding table, a clamp is arranged on a surface of the stage facing the pressure rod, the clamp can stably clamp a to-be-tested sample, the diamond indenter can move to be in contact with the to-be-tested sample, and the stage can move to a position where the to-be-tested sample is over against the tip end of the pressure rod along the sliding table;

the infrared thermal imaging assembly is arranged on one side of the pressure rod, and an infrared thermal imaging range of the infrared thermal imaging assembly comprises the force sensor, the pressure rod, the to-be-tested sample and the stage;

the refrigeration device is arranged on one side of the pressure rod and is connected to a pressure rod micro-channel embedded in the pressure rod through a pressure rod inlet cold pipe and a pressure rod outlet cold pipe to form a circulating pipeline, so that the refrigeration device can circulate a refrigerating medium in the pressure rod; the refrigeration device is also connected to a stage micro-channel embedded in the stage through a stage inlet cold pipe and a stage outlet cold pipe to form a circulating pipeline, so that the refrigeration device can circulate a refrigerating medium in the stage; and a cold conduction wire is also provided between the pressure rod and the stage, wherein one end of the cold conduction wire is connected to a position close to the diamond indenter, the other end is connected to a position on the stage close to the to-be-tested sample, so that heat exchange can be performed between the pressure rod and the stage through the cold conduction wire.

According to one embodiment of the present invention, a refrigeration balancer is arranged below the pressure rod, wherein the refrigeration balancer comprises an outer frame, a cold conduction plate, a limiting hanging buckle and a cold storage container, the outer frame is a hollow container at least provided with a set of side openings, at least part of a top surface of the outer frame is the cold conduction plate, the limiting hanging buckle tightly attached to the cold conduction plate is arranged above the top surface, and the limiting hanging buckle can clamp the cold conduction wire on the top surface of the outer frame to keep contact with the cold conduction plate; and the cold storage container is detachably arranged in the outer frame and is used to completely fill an inner space of the outer frame, at least one side surface of the cold storage container is a transparent observation window, the observation window is positioned at the side opening of the outer frame, a top of the cold storage container is a cold conduction top plate, and the inside of the cold storage container is filled with a phase change material, so that the phase change material can sequentially pass through the cold conduction top plate and the cold conduction plate to implement heat exchange with the cold conduction wire.

In addition, the present invention further provides a micro-nano impact indentation testing method based on cyclic refrigeration, which adopts the above device for testing and comprises the following steps:

step S1: assembling a refrigeration pipeline according to the above device, fixing a to-be-tested sample on a stage, mounting a diamond indenter on a pressure rod, and adjusting the stage and the pressure rod to enable the diamond indenter to correspond to a position of the to-be-tested sample;

step S2: clamping a cold conduction wire in a limiting hanging buckle of a refrigeration balancer, keeping the cold conduction wire in contact with a cold conduction plate, filling a phase change material with a corresponding experiment temperature in a cold storage container according to an experiment requirement, and performing cold storage on the phase change material at the experiment temperature in advance;

step S3: outputting a shielding gas through a shielding gas channel, setting an infrared thermal imaging assembly and a camera assembly to be in a working state, starting a refrigeration device to perform cyclic refrigeration on the indenter and the stage until the indenter and the stage are at an experimental temperature, and arranging the cold storage container filled with a phase change material subjected to cold storage in advance in the refrigeration balancer; and step S4: after observing that the indenter and the stage are stable at the experimental temperature, controlling a drive platform, a piezoelectric stack and other assemblies to perform low-temperature impact indentation experiment and collecting relevant data from the impact indentation experiment.

The present invention has the technical effects as follows.

1. The present invention can implement micro-nano impact indentation testing under low temperature condition, which adopts a mode of embedding a micro-channel to refrigerate a sample for test and a test indenter at the same time, and arranges a cold conduction wire in contact with a refrigeration balancer between the sample and the test indenter, and can implement bidirectional cold supply between the sample and the test indenter through the refrigeration balancer and the cold conduction wire at the experimental temperature, so that the temperature between the sample and the test indenter can be stably kept at the experimental temperature, thereby rapidly balancing the temperature difference between the sample and the test indenter due to the difference in cooling degree, eliminating the influence of temperature drift on the test precision, and enabling the test result to be more representative.

2. The present invention can regulate the output power of the refrigeration device in real time according to the information fed back by a thermocouple and a thermal imaging assembly so as to achieve continuous temperature regulation, and the whole experimental device has a simple structure, a compact layout, no need of an atmosphere refrigerating chamber and high integration degree, and provides effective support for revealing the microscopic failure mechanism and the performance evolution rule of the material under the low-temperature impact condition.

BRIEF DESCRIPTION OF DRAWINGS

To describe the technical solutions in embodiments of the present invention more clearly, the following briefly describes the accompanying drawings used in describing the embodiments.

FIG. 9 is a cross-sectional view of a stage according to the present invention; and in the drawings, 1: linear motor, 2: drive platform, 3: hinge base, 4: piezoelectric stack, 5: force sensor, 6: cold insulation baffle, 7: pressure rod micro-channel, 71: pressure rod inlet cold pipe, 72: pressure rod outlet cold pipe, 8: pressure rod, 9: pressure rod thermocouple, 10: diamond indenter, 11: infrared thermal imaging assembly, 12: cold conduction wire, 13: stage thermocouple, 14: to-be-tested sample, 15: clamp, 16: shielding gas channel, 17: stage, 18: stage micro-channel, 181: stage inlet cold pipe, 182: stage outlet cold pipe, 19: sliding table, 20: refrigeration device, 21: refrigeration balancer, 22: camera assembly, 211: outer frame, 212: cold conduction plate, 213: limiting hanging buckle, 214: cold storage container, 215: observation window, 216: cold conduction top plate, and 217: phase change material.

DETAILED DESCRIPTION OF THE EMBODIMENTS

The present invention is further described in detail below with reference to the embodiments and drawings.

To make objectives, technical solutions, and advantages of embodiments of the present invention clearer, the following clearly and completely describes the technical solutions in embodiments of the present invention with reference to the accompanying drawings in embodiments of the present invention. The following detailed descriptions of embodiments of the present invention provided in the accompanying drawings are not intended to limit the scope of the present invention that claims protection, but merely to represent selected embodiments of the present invention.

Figure 2:
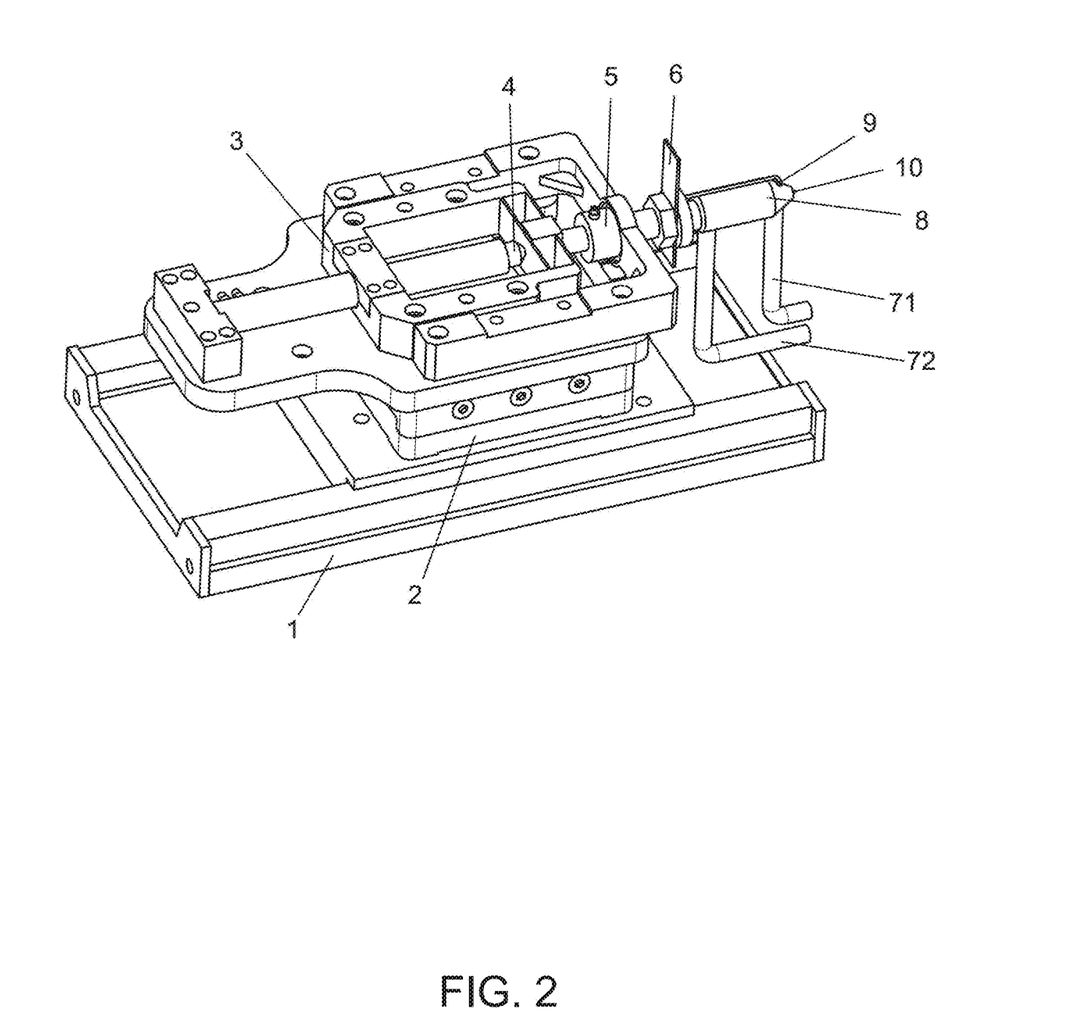
FIG. 2 is a schematic isometric view of a pressure rod according to the present invention.

Embodiment:

The micro-nano impact indentation testing device based on cyclic refrigeration according to the present invention mainly comprises a linear motor 1, a drive platform 2, a piezoelectric stack 4, a pressure rod 8, an infrared thermal imaging assembly 11, a stage 17, a sliding table 19 and a refrigeration device 20, wherein the drive platform 2 is arranged on the linear motor 1 and can move towards the stage 17 under the driving of the linear motor 1, and the assembly on the drive platform 2 shown in FIG. 2 is driven to integrally move along a displacement output direction of the linear motor 1 under the action of the linear motor 1.

It can also be seen in FIG. 2 that the drive platform 2 is further provided with a hinge base 3, the hinge base 3 is provided with the piezoelectric stack 4 and the pressure rod 8 which are connected, a tip end of the pressure rod 8 is provided with a diamond indenter 10, so that the pressure rod 8 and the diamond indenter 10 can move towards the stage 17 under the push of the piezoelectric stack 4, and a force sensor 5 is arranged between the pressure rod 8 and the piezoelectric stack 4 and used to obtain a pushing force applied by the piezoelectric stack 4 to the pressure rod 8. The structure of this part can refer to the relevant description of an electromagnetic-piezoelectric coupling impact module in Chinese Patent CN118111838A, the main working process of which is that after the drive platform 2 drives the hinge base 3 to integrally move to a testing position, the piezoelectric stack 4 can further provide "electromagnetic-piezoelectric" coupling impact to the pressure rod 8, so that the diamond indenter 10 at the tip end of the pressure rod 8 generates indentation on the surface of a to-be-tested sample 14, and the impact indentation performance test is achieved.

Figure 3:
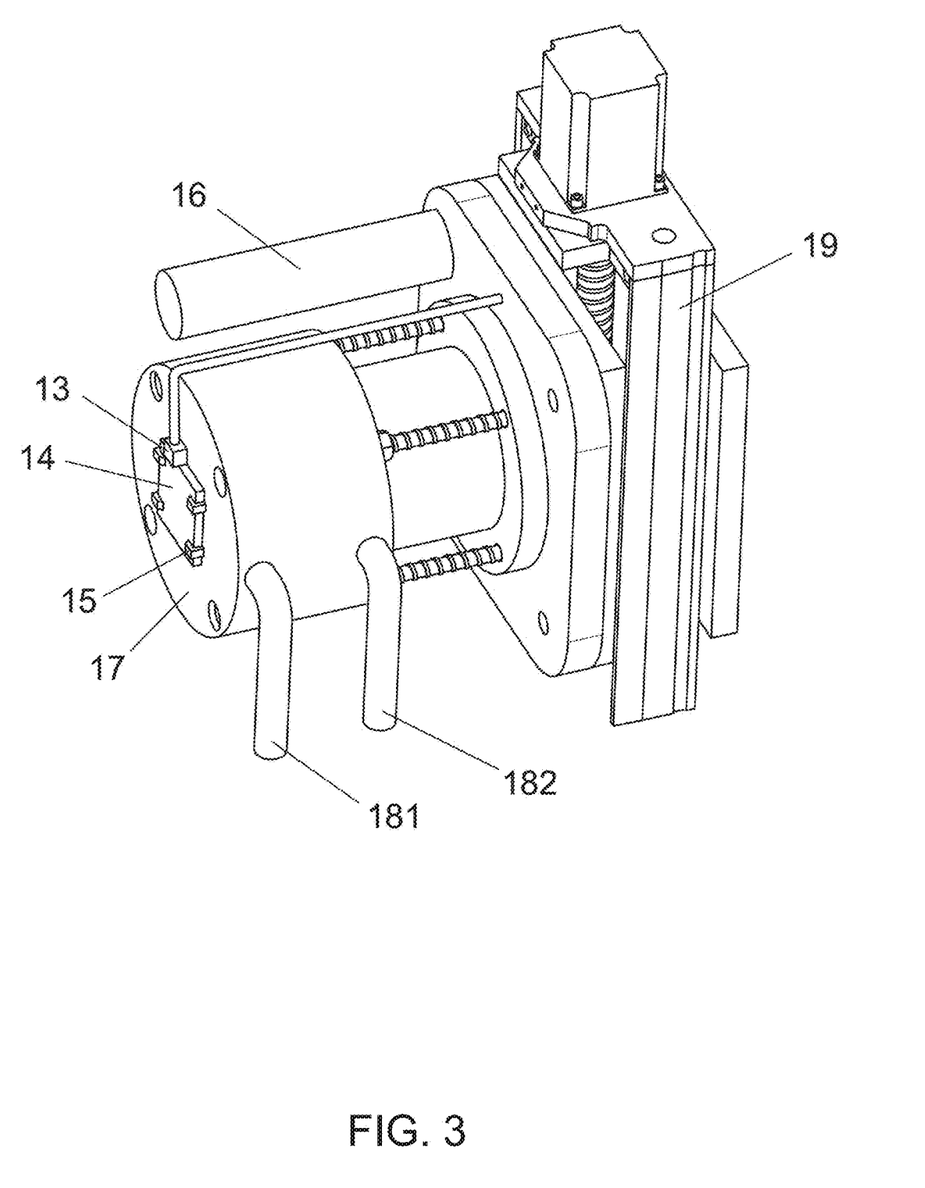
FIG. 3 is a schematic isometric view of a stage according to the present invention.

Referring to FIG. 3, the stage 17 is arranged on the sliding table 19, a clamp 15 is arranged on a surface of the stage facing the pressure rod 8, the clamp 15 can stably clamp the to-be-tested sample 14, the diamond indenter 10 can move to be in contact with the to-be-tested sample 14, and the stage 17 can move to a position where the to-be-tested sample 14 is over against the tip end of the pressure rod 8 along the sliding table 19. In this embodiment, the sliding table 19 is an up-and-down single-degree-of-freedom sliding member, that is, the stage 17 moves up and down along the sliding table 19, so as to adjust a contact position between the to-be-tested sample 14 and the diamond indenter 10. The clamp 15 may refer to a conventional planar clamping structure in the prior art. When an experiment is required, a plate of the to-be-tested sample 14 is provided on the clamp 15, and the diamond indenter 10 is moved to a position sufficiently close to the to-be-tested sample 14.

In this embodiment, the sliding table 19 is further provided with a shielding gas channel 16 capable of spraying shielding gas to the hinge base 3. Since the impact indentation testing environment tracked by the present invention is a low-temperature test, which easily causes moisture in the environment to condense and interfere with the test process, the shielding gas channel 16 is provided for spraying shielding gas to the test position, and a low-moisture atmosphere is formed in the test area by discharging gas with a high moisture content in the test area. The use mode of the shielding gas channel 16 can refer to the description of a nitrogen generation module in Chinese Patent CN118111838A, that is, the shielding gas channel is directly connected to a shielding gas source, and shielding gas is supplied and stopped at any time based on a requirement, so the shielding gas in the present invention can also adopt nitrogen. In addition, the application environment of the experimental device in the present invention can be divided into a closed mode and an open mode, the closed mode can be used with reference to the above Chinese Patent, where the shielding gas is injected into a closed box body in which the device is located, and all the high-moisture gas is discharged, so as to avoid interference caused by moisture condensation; and when the device in the present invention performs the experiment in the open mode, the flow generated by the shielding gas channel 16 needs to be adjusted to generate a gas curtain at the part between the pressure rod 8 and the stage 17 and the position where the force sensor 5 is located.

Figure 1:
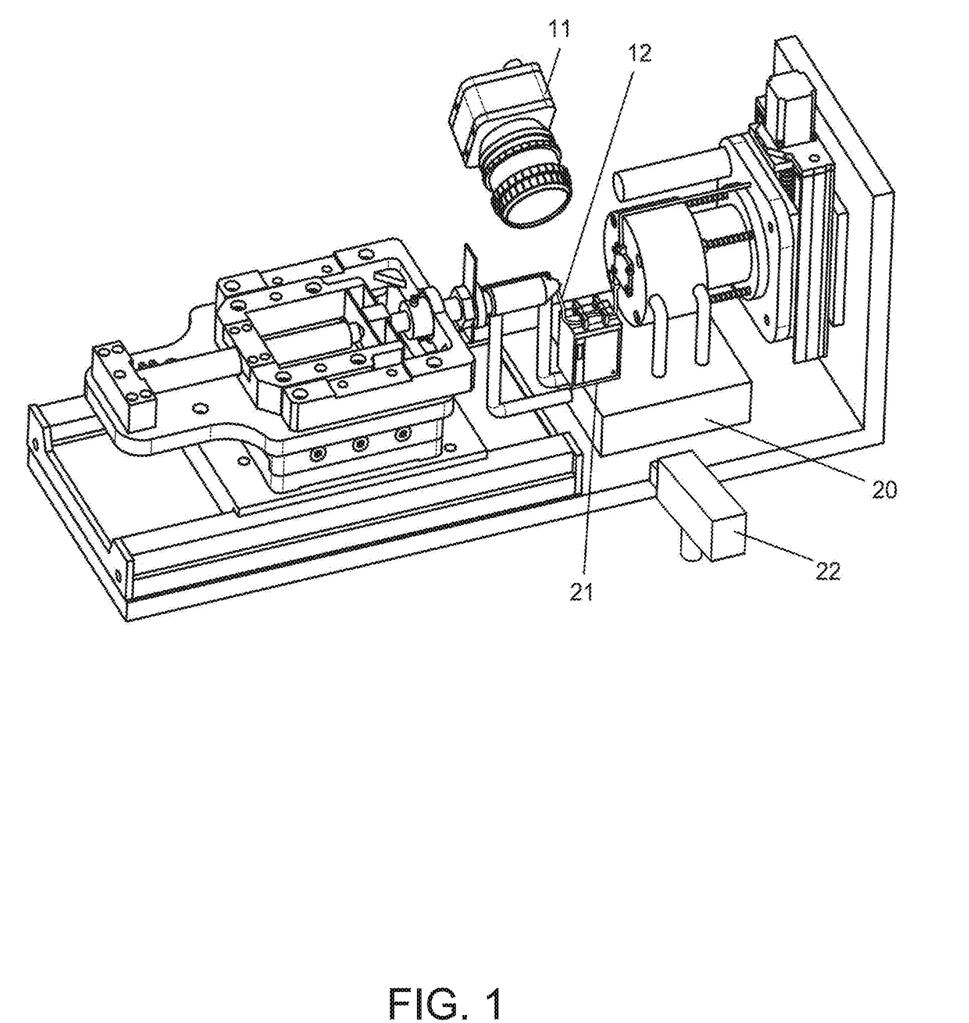
FIG. 1 is an overall schematic isometric view of the present invention.

Referring to FIG. 1, the infrared thermal imaging assembly 11 is arranged on one side of the pressure rod 8, an infrared thermal imaging range of the infrared thermal imaging assembly comprises the force sensor 5, the pressure rod 8, the to-be-tested sample 14 and the stage 17, the infrared thermal imaging assembly 11 is used to uniformly monitor the temperature change during the experiment process, which can adopt the common infrared monitoring equipment in the field such as an infrared camera, the monitoring range of the infrared camera should comprise the force sensor 5, the pressure rod 8, the to-be-tested sample 14 and the stage 17 which may be affected by temperature to generate performance change, the collected data can be connected to an external host or an electronic control module, and the connection mode can refer to the arrangement between the host and the electronic control module in Chinese Patent CN118111838A. In addition, all devices or electronic elements in this instrument which are subjected to electronic control or data collection can also be connected to the external host or the electronic control module in an electrical connection mode, and this electrical control is not limited to control of the infrared thermal imaging assembly 11.

Referring to FIG. 1, the refrigeration device 20 is arranged on one side of the pressure rod 8 and is connected to a pressure rod micro-channel 7 embedded in the pressure rod 8 through a pressure rod inlet cold pipe 71 and a pressure rod outlet cold pipe 72 to form a circulating pipeline, so that the refrigeration device 20 can circulate a refrigerating medium in the pressure rod 8; and the refrigeration device 20 is also connected to a stage micro-channel 18 embedded in the stage 17 through a stage inlet cold pipe 181 and a stage outlet cold pipe 182 to form a circulating pipeline, so that the refrigeration device 20 can circulate a refrigerating medium in the stage 17. It can be seen from FIGS. 6 and 7, the pressure rod 8 is internally provided with the pressure rod micro-channel 7, the arrangement of the pressure rod micro-channel 7 can refer to the spirally arranged medium heat conduction pipe in the prior art, and the pressure rod micro-channel is connected to the pressure rod inlet cold pipe 71 and the pressure rod outlet cold pipe 72 to form a heat conduction circulation structure, so that the heat conduction medium can be circulated into the pressure rod micro-channel 7 through the refrigeration device 20. It can be further seen by combining with FIG. 2 that the pressure rod inlet cold pipe 71 is connected to the pressure rod micro-channel 7 closer to one side where the diamond indenter 10 is located, that is, the circulation of the heat conduction medium should enter the pressure rod micro-channel 7 through the pressure rod inlet cold pipe 71, the heat conduction medium after heat exchange is discharged from the pressure rod outlet cold pipe 72, so that the temperature of the diamond indenter 10 is preferably stabilized.

Figure 8:
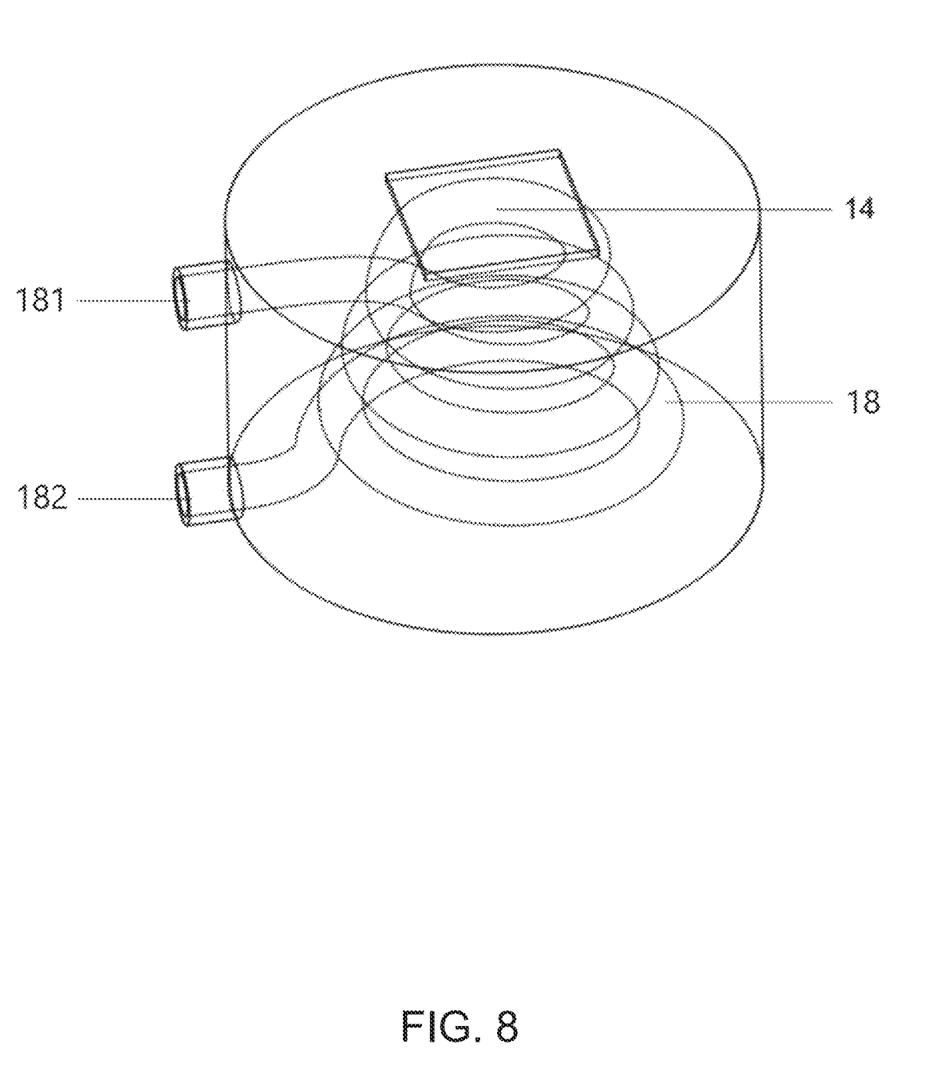
FIG. 8 is a perspective view of a stage according to the present invention.
Figure 9:
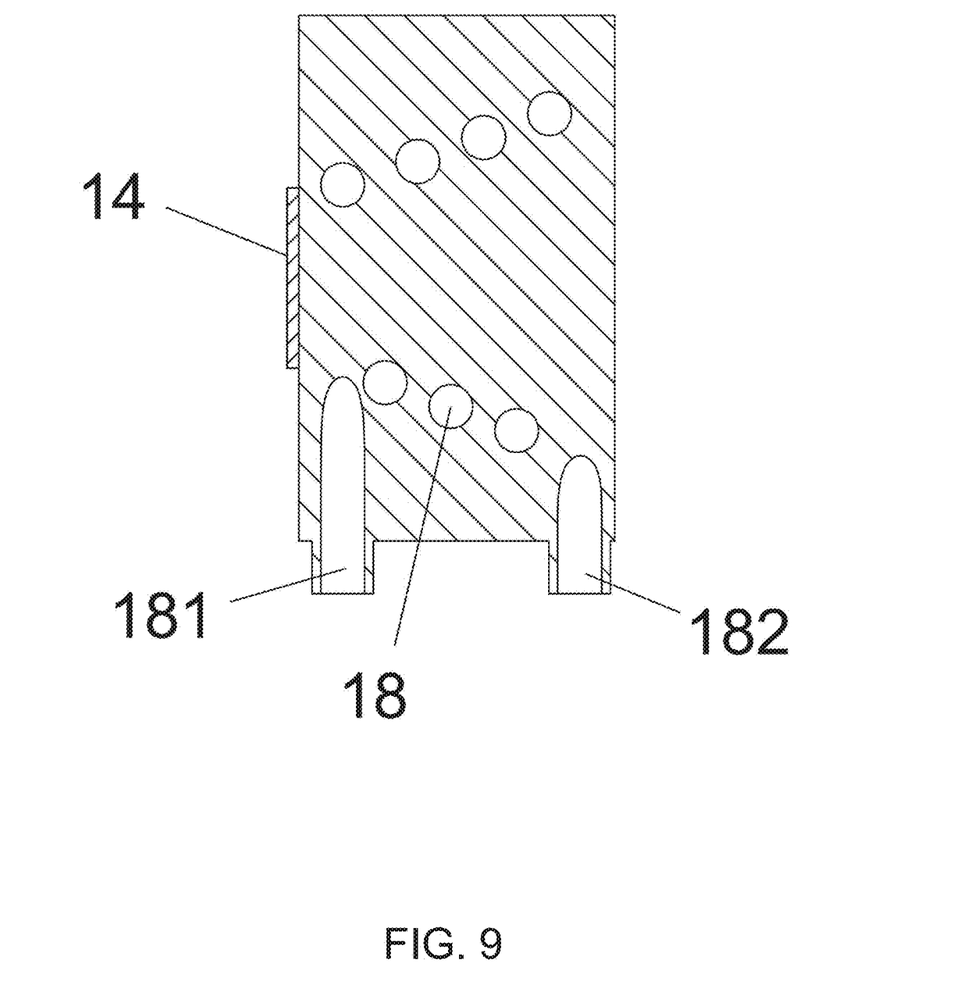

Meanwhile, the present invention needs to implement testing under low temperature conditions, so that the heat conduction medium is a cooling medium, and the circulation of the cooling medium should run through the whole test process, so that the pressure rod 8 is kept under the low-temperature condition in the whole process. Similarly, it can be seen from FIGS. 8 and 9 that the stage 17 is also cooled by adopting a low-temperature medium circulation cooling mode similar to the pressure rod 8. It can be further seen from FIG. 3 that the stage inlet cold pipe 181 should be connected to the stage micro-channel 18 closer to one side of the to-be-tested sample 14, so as to preferentially stabilize the temperature of the to-be-tested sample 14. Since the diameters of the pressure rod micro-channel 7 and the circulating cold pipe may be different from those of the stage micro-channel 18 and the circulating cold pipe, to eliminate the influence of different pipe diameters on the cooling effect, two sets of independent refrigeration hosts can be integrated in the refrigeration device 20 to cool the pressure rod 8 and the stage 17 separately, thereby achieving the accurate regulation of the temperatures of the diamond indenter 10 and the to-be-tested sample 14.

The refrigeration device 20 can refer to heat exchange equipment such as an ice machine commonly used in the prior art. It is clear that a heat dissipation end of the refrigeration device should be arranged far away from the pressure rod 8 and the stage 17, and especially when the experimental device in the present invention is built into a sealed box for experiment, the refrigeration device 20 or the heat dissipation end of the refrigeration device 20 should be arranged outside the sealed box, so that the influence of generated heat on the low-temperature environment required by the whole experimental device is avoided.

Referring to FIG. 1, a cold conduction wire 12 is also provided between the pressure rod 8 and the stage 17, wherein one end of the cold conduction wire 12 is connected to a position close to the diamond indenter 10, the other end is connected to a position on the stage 17 close to the to-be-tested sample 14, so that heat exchange can be performed between the pressure rod 8 and the stage 17 through the cold conduction wire 12. It can be seen from the above that since the specification and the size of the pressure rod 8 is different from those of the stage 17, the specifications of the micro-channels in the pressure rod and the stage are different, the refrigeration power of different refrigeration devices 20 is difficult to be completely consistent, and therefore, the temperature between the pressure rod 8 and the stage 17 in the experiment process is usually not completely equal to the set experiment temperature; consequently, the temperature difference exists between the diamond indenter 10 and the to-be-tested sample 14, which is equivalent to additionally introducing a temperature variable in the experiment process, and the accuracy of the impact indentation experiment result is further affected. Therefore, in the present invention, a cold conduction wire 12 is arranged between the pressure rod 8 and the stage 17, the cold conduction wire 12 can be composed of a plurality of groups of fine wires of materials with good thermal conductivity, and the pressure rod 8 contacts with the stage 17, so that the heat of the pressure rod and the heat of the stage are allowed to be mutually transferred through the cold conduction wires 12, the temperature difference between the pressure rod and the stage is balanced, and the temperature error caused by different cold quantities generated by different refrigeration devices 20 is eliminated to a certain extent. In this embodiment, the material of the cold conduction wire 12 is red copper, which has better ductility and excellent heat conduction effect; in addition, too long cold conduction wire 12 will reduce the efficiency of heat conduction, and the too short cold conduction wire may affect the result of the impact pressing process due to the stretching effect. Therefore, the cold conduction wire 12 should select a suitable length based on an experimental requirement.

Figure 4:
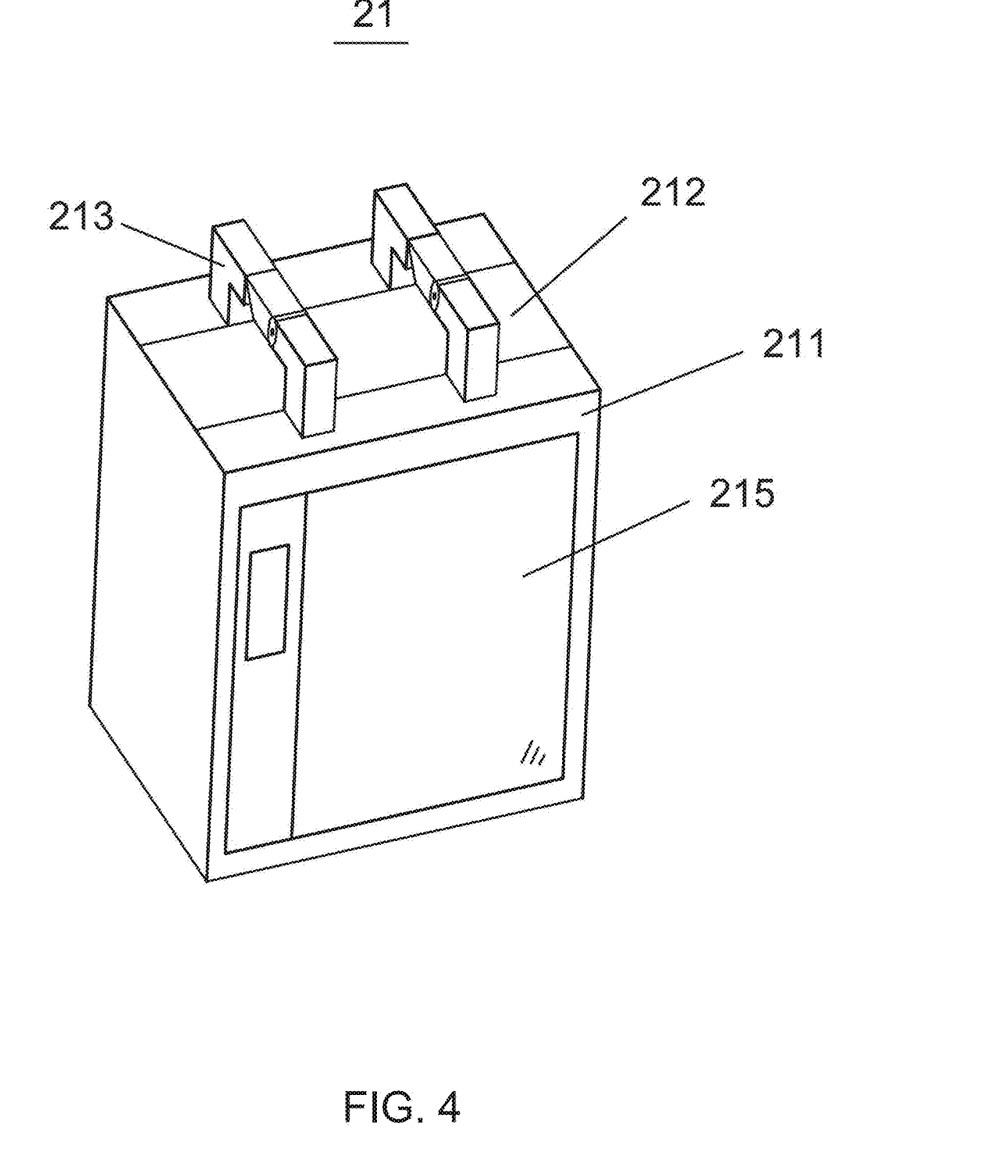
FIG. 4 is a schematic isometric view of a refrigeration balancer according to the present invention.
Figure 5:
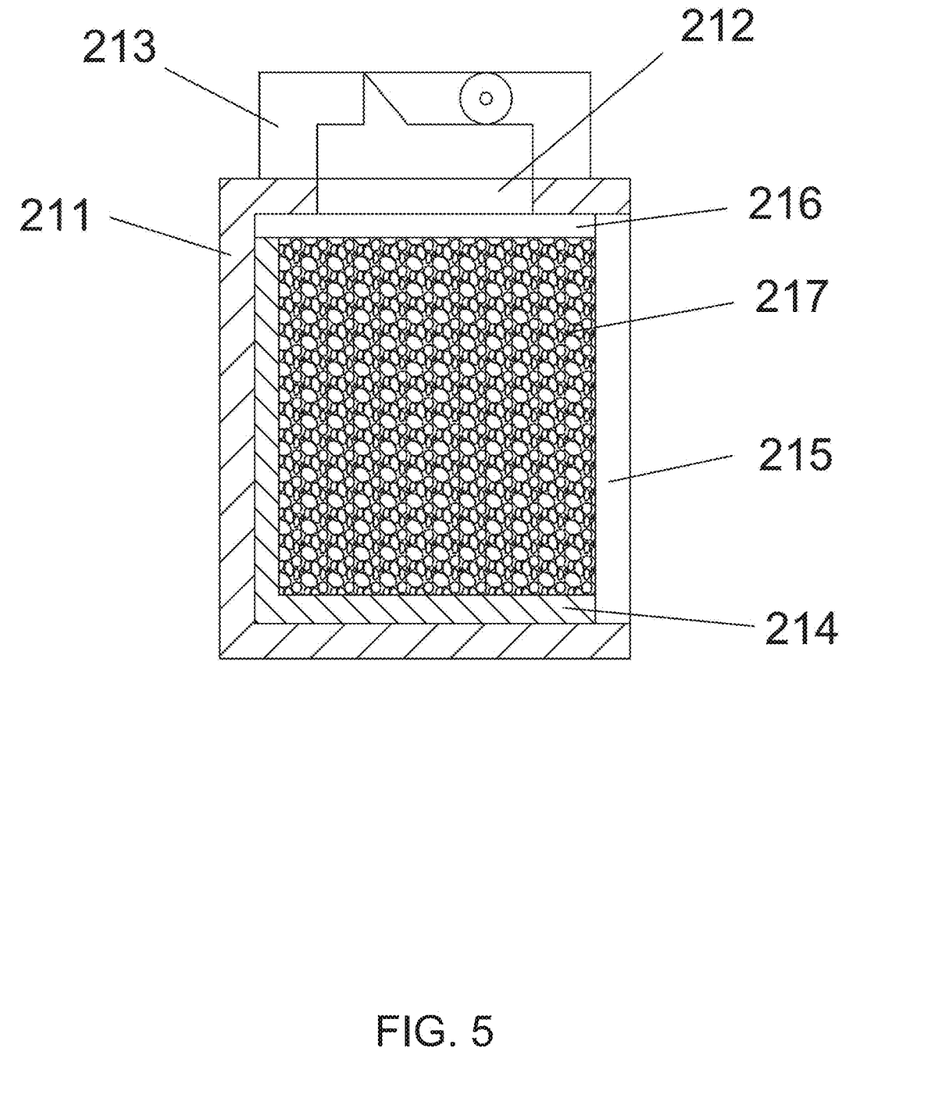
FIG. 5 is a cross-sectional view of a refrigeration balancer according to the present invention.

Referring to FIGS. 1, 4, and 5, a refrigeration balancer 21 is arranged below the pressure rod 8, wherein the refrigeration balancer 21 comprises an outer frame 211, a cold conduction plate 212, a limiting hanging buckle 213 and a cold storage container 214, the outer frame 211 is a hollow container at least provided with a set of side openings, at least part of a top surface of the outer frame is the cold conduction plate 212, the limiting hanging buckle 213 tightly attached to the cold conduction plate 212 is arranged above the top surface, and the limiting hanging buckle 213 can clamp the cold conduction wire 12 on the top surface of the outer frame 211 to keep contact with the cold conduction plate 212. It can be seen that during the experiment, the limiting hanging buckle 213 on the top of the refrigeration balancer 21 can clamp the cold conduction wire 12 to keep in contact with the cold conduction plate 212, thereby avoiding the inability to conduct temperature during the impact indentation experiment due to the cold conduction wire 12 being out of contact with the cold conduction plate 212.

The cold storage container 214 is detachably arranged in the outer frame 211 and is used to completely fill an inner space of the outer frame, and the cold storage container 214 can be arbitrarily detached and replaced based on a requirement. At least one side surface of the cold storage container 214 is a transparent observation window 215, the observation window 215 is positioned at the side opening of the outer frame 211, a top of the cold storage container 214 is a cold conduction top plate 216, and the inside of the cold storage container 214 is filled with a phase change material 217, so that the phase change material 217 can sequentially pass through the cold conduction top plate 216 and the cold conduction plate 212 to implement heat exchange with the cold conduction wire 12. The phase change material 217 can fully release or absorb latent heat in the phase change process, so that the temperature of the environment can be stabilized for a long time. After the cold storage container 214 is arranged on the outer frame 211, the phase change material 217 can provide cold for the pressure rod 8 and the stage 17 through the cold conduction wire 12 (namely, the heat of the pressure rod and the stage is absorbed), and therefore, the temperature of the pressure rod 8 and the stage 17 is stabilized at a phase change point temperature, namely the temperature required by the experiment, which makes the pressure rod 8 and the stage 17 to be kept at the experiment temperature in the impact indentation process and ensures the accuracy of the experimental results. It is clear that the low-temperature phase change point of the phase change material needs to be equal to the experimental temperature so as to ensure that the phase change material can absorb heat and supply cold. Before the experiment, the phase change material 217 is required to fill in the cold storage container 214 according to the experimental temperature condition and is cooled to the phase change point temperature equal to the experimental temperature in advance, and the phase change material 217 is preferably a material with a wide phase change point range, such as a phase change polymer. In addition, since the heat transfer process between the phase change material 217 and the cold conduction wire 12 needs to sequentially pass through the cold conduction top plate 216 and the cold conduction plate 212, the materials constituting the cold conduction top plate 216 and the cold conduction plate 212 preferably have a higher thermal conductivity than the cold conduction wire 12. In this embodiment, the red copper is used.

In this embodiment, a camera assembly 22 is arranged on one side of the refrigeration balancer 21, the camera area of the camera assembly 22 comprises the whole observation window 215, the camera assembly 22 can adopt a camera device conventionally used in the prior art, and its use mode is the same as that of the infrared thermal imaging assembly 11, that is, the camera assembly is electrically connected to an external host or an electronic control module, and directly transmits the collected video data to the external host or the electronic control module. The camera assembly 22 is used to observe the state of the phase change material 217 through the observation window 215. When the camera assembly 22 observes that the phase change material 217 is in a two-phase coexisting state, it indicates that the phase change material 217 is at a phase change point, the temperature is stabilized and unchanged, and stable heat absorption and cold supply can be performed on the pressure rod 8 and the stage 17, and the diamond indenter 10 and the to-be-tested sample 14 respectively arranged thereon. In this case, the collected experimental data is accurate. If the camera assembly 22 observes that the phase change material 217 is in a single phase state outside the phase change point, it indicates that the phase change material 217 cannot absorb heat or supply cold stably. In this case, the data collected in the experiment is suspicious, and it is necessary to judge whether to retain the data according to the specific situation. In addition, when the experimental device is placed in a sealed box, the camera assembly 22 can assist in observing the internal conditions.

Figure 6:
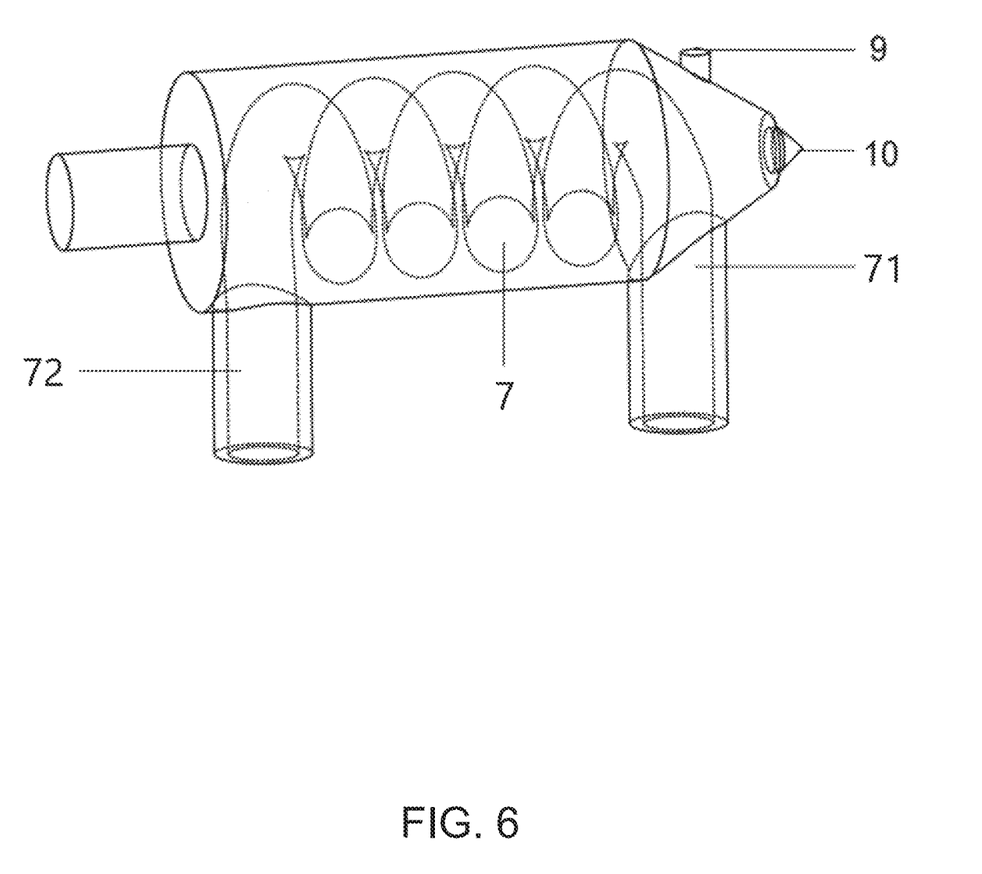
FIG. 6 is a perspective view of a pressure rod according to the present invention.
Figure 7:
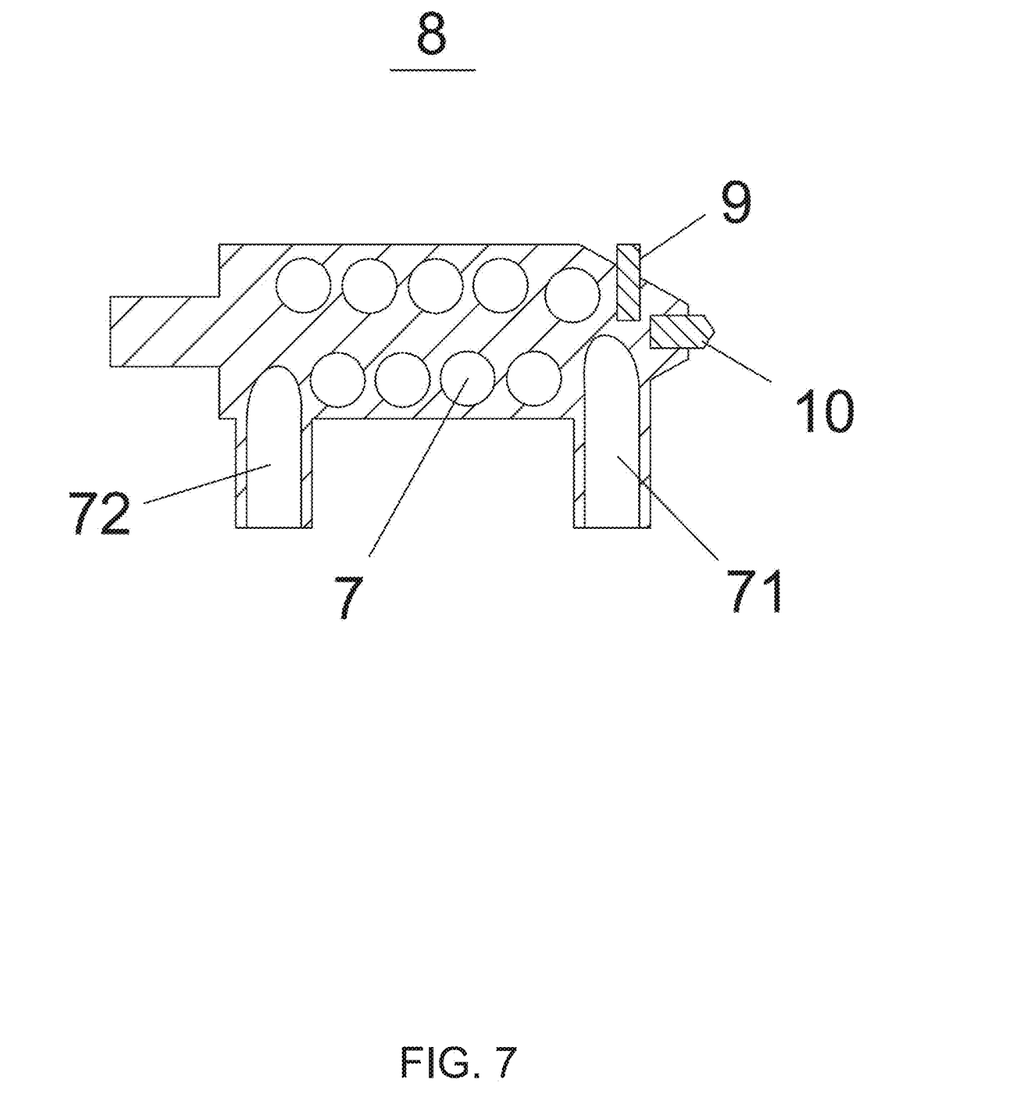
FIG. 7 is a cross-sectional view of a pressure rod according to the present invention.

Referring to FIGS. 3 and 6, a pressure rod thermocouple 9 is arranged on the pressure rod 8 close to the diamond indenter 10, a stage thermocouple 13 is arranged on the stage 17 close to the to-be-tested sample 14, and a distance between the pressure rod thermocouple 9 and the diamond indenter 10 and a distance between the stage thermocouple 13 and the to-be-tested sample 14 are both within 0.5 mm. In addition to obtaining temperature information by using an infrared thermal imaging assembly 11, the thermocouples directly arranged on the pressure rod 8 and the stage 17 can accurately obtain temperature change information of the pressure rod and the stage in the experimental process in real time, and the contact distances between the two thermocouples and the diamond indenter 10 and the to-be-tested sample 14 are both within 0.5 mm, so that the temperature data of the diamond indenter 10 and the to-be-tested sample 14 can be obtained without affecting the impact indentation experiment.

In this embodiment, a cold insulation baffle 6 is provided between the force sensor 5 and the pressure rod 8 to prevent the low temperature from being transmitted to the force sensor 5. The cold insulation baffle 6 is mainly used to contain and block and is made of an aluminum silicate ceramic material with low price, easiness in processing and good cold insulation effect, which can reduce the low temperature from being transmitted to the force sensor 5 as much as possible, thereby affecting the measurement precision of the force sensor 5.

In addition, the surfaces of the pressure rod inlet cold pipe 71, the pressure rod outlet cold pipe 72, the stage inlet cold pipe 181 and the stage outlet cold pipe 182 in this embodiment are all coated with a heat insulation material, so that low-temperature dissipation can be reduced, and the refrigeration efficiency of the pressure rod 8 and the stage 17 is further improved.

A testing method of the above micro-nano impact indentation testing device based on cyclic refrigeration comprises the following steps:

step S1: assembling a refrigeration pipeline according to the above device, fixing a to-be-tested sample on a stage, mounting a diamond indenter on a pressure rod, and adjusting the stage and the pressure rod to enable the diamond indenter to correspond to a position of the to-be-tested sample;

step S2: clamping a cold conduction wire in a limiting hanging buckle of a refrigeration balancer, keeping the cold conduction wire in contact with a cold conduction plate, filling a phase change material with a phase change point equal to the experimental temperature in a cold storage container according to an experimental requirement, and performing cold storage on the phase change material to a phase change point temperature in advance;

step S3: outputting a shielding gas through a shielding gas channel, setting an infrared thermal imaging assembly and an image shooting assembly to be in a working state, starting a refrigeration device to perform cyclic refrigeration on the indenter and the stage until the indenter and the stage are at an experimental temperature, arranging the cold storage container filled with the phase change material subjected to cold storage in advance in the refrigeration balancer, and supplying cold to the indenter and the stage by the phase change material with the phase change point in the cold storage container, so that the temperatures of the indenter and the stage can be stably kept at the phase change point temperature, namely, the experimental temperature; and step S4: after observing that the indenter and the stage are stable at the experimental temperature, controlling a drive platform, a piezoelectric stack and other assemblies to perform low-temperature impact indentation experiment and collecting relevant data from the impact indentation experiment, wherein the displacement data is the displacement data of the diamond indenter in the low-temperature impact indentation experiment, this data can refer to the conventional method of obtaining displacement data in the prior art, and a displacement sensor whose data collection range can cover the entire movement range of the diamond indenter is provided on the device or on a side surface thereof for collection.

In conclusion, the present invention achieves "electro-magnetic-piezoelectric" coupling impact by adopting two-stage drive, the piezoelectric stack completes the "transient indentation" after the linear motor achieves the "long-range approach", the force sensor obtains mechanical test data of materials, the displacement sensor obtains displacement data of the diamond indenter, the thermocouple obtains temperature data of the diamond indenter and the to-be-tested sample, and the drive platform and the sliding table are used to achieve the function of applying load at any point of the sample, thereby completing the test of the dot matrix low-temperature impact indentation performance of the sample.

The low-temperature loading method uses an embedded microchannel to cool the sample and the indenter at the same time. The cold conduction wire is used to quickly balance the temperature difference. Meanwhile, a detachable cold storage container with the built-in phase change material in contact with the cold conduction wire is used to cool the sample and the indenter. The temperatures of the sample and the indenter are stably kept at the preset temperature of the experiment through the phase change endothermic process of the phase change material, so that the temperature conditions of the experiment are accurately controlled, the temperature difference between the sample and the indenter is eliminated, and the problem of temperature drift affecting the test precision is effectively solved.

In addition, the experimental device can regulate output power in real time according to information fed back by the thermocouple and the infrared thermal imaging assembly, achieves continuous regulation of temperature by regulating the temperature of the refrigeration medium and replacing the cold storage container, has a simple structure, a compact layout and no need of an atmosphere refrigerating chamber, and is easy to integrate a testing device into a multi-physics field in-situ monitoring assembly, which provides a method with higher accuracy for revealing the microscopic failure mechanism and the performance evolution rule of the material under the low-temperature impact condition.

In the description of the present invention, it should be noted that directions or positional relationships indicated by terms such as "upper", "lower", "front", "rear", "left", "right", "top", "bottom", "in", and "out" are those shown based on the accompanying drawings, are merely intended to facilitate and simplify description rather than indicate or imply that the indicated device or element must have a specific direction and be structured and operated according to the specific direction, and should not be construed as limiting the present invention.

The above descriptions are merely preferred specific embodiments of the present invention, however, the protection scope of the present invention is not limited thereto, and any modifications and substitutions that can be easily conceived by those skilled in the art within the technical scope disclosed by examples of the present invention shall fall within the protection scope of the present invention.

What is claimed is:

1. A micro-nano impact indentation testing device based on cyclic refrigeration, comprising: a linear motor, a drive platform, a piezoelectric stack, a pressure rod, an infrared thermal imaging assembly, a stage, a sliding table and a refrigeration device, wherein,
    the drive platform is arranged on the linear motor and can move towards the stage under the driving of the linear motor; the drive platform is further provided with a hinge base, the hinge base is provided with the piezoelectric stack and the pressure rod which are connected, a tip end of the pressure rod is provided with a diamond indenter, so that the pressure rod and the diamond indenter can move towards the stage under the push of the piezoelectric stack, and a force sensor is arranged between the pressure rod and the piezoelectric stack and used to obtain a pushing force applied by the piezoelectric stack to the pressure rod;
    the stage is arranged on the sliding table, a clamp is arranged on a surface of the stage facing the pressure rod, the clamp can stably clamp a to-be-tested sample, the diamond indenter can move to be in contact with the to-be-tested sample, and the stage can move to a position where the to-be-tested sample is over against the tip end of the pressure rod along the sliding table;
    the infrared thermal imaging assembly is arranged on one side of the pressure rod, and an infrared thermal imaging range of the infrared thermal imaging assembly comprises the force sensor, the pressure rod, the to-be-tested sample and the stage;
    the refrigeration device is arranged on one side of the pressure rod and is connected to a pressure rod micro-channel embedded in the pressure rod through a pressure rod inlet cold pipe and a pressure rod outlet cold pipe to form a circulating pipeline, so that the refrigeration device can circulate a refrigerating medium in the pressure rod; the refrigeration device is also connected to a stage micro-channel embedded in the stage through a stage inlet cold pipe and a stage outlet cold pipe to form a circulating pipeline, so that the refrigeration device can circulate a refrigerating medium in the stage;
    a cold conduction wire is also provided between the pressure rod and the stage, wherein one end of the cold conduction wire is connected to a position close to the diamond indenter, the other end is connected to a position on the stage close to the to-be-tested sample, so that heat exchange can be performed between the pressure rod and the stage through the cold conduction wire;
    wherein a refrigeration balancer is arranged below the pressure rod, the refrigeration balancer comprises an outer frame, a cold conduction plate, a limiting hanging buckle and a cold storage container, the outer frame is a hollow container at least provided with a set of side openings, at least part of a top surface of the outer frame is the cold conduction plate, the limiting hanging buckle tightly attached to the cold conduction plate is arranged above the top surface, and the limiting hanging buckle can clamp the cold conduction wire on the top surface of the outer frame to keep contact with the cold conduction plate; and
    the cold storage container is detachably arranged in the outer frame and is used to completely fill an inner space of the outer frame, at least one side surface of the cold storage container is a transparent observation window, the observation window is positioned at the side opening of the outer frame, a top of the cold storage container is a cold conduction top plate, and the inside of the cold storage container is filled with a phase change material, so that the phase change material can sequentially pass through the cold conduction top plate and the cold conduction plate to implement heat exchange with the cold conduction wire.

2. The micro-nano impact indentation testing device based on cyclic refrigeration according to claim 1, wherein a camera assembly is arranged on one side of the refrigeration balancer, and a camera area of the camera assembly comprises the whole observation window.

3. The micro-nano impact indentation testing device based on cyclic refrigeration according to claim 1, wherein the cold conduction wire, the cold conduction plate and the cold conduction top plate are made of red copper.

4. The micro-nano impact indentation testing device based on cyclic refrigeration according to claim 1, wherein a pressure rod thermocouple is arranged on the pressure rod close to the diamond indenter, a stage thermocouple is arranged on the stage close to the to-be-tested sample, and a distance between the pressure rod thermocouple and the diamond indenter and a distance between the stage thermocouple and the to-be-tested sample are both within 0.5 mm.

5. The micro-nano impact indentation testing device based on cyclic refrigeration according to claim 1, wherein a cold insulation baffle is provided between the force sensor and the pressure rod and is used to prevent the low temperature from being transmitted to the force sensor.

6. The micro-nano impact indentation testing device based on cyclic refrigeration according to claim 1, wherein the surfaces of the pressure rod inlet cold pipe, the pressure rod outlet cold pipe, the stage inlet cold pipe and the stage outlet cold pipe are all coated with a heat insulation material.

7. The micro-nano impact indentation testing device based on cyclic refrigeration according to claim 1, wherein the sliding table is further provided with a shielding gas channel capable of spraying shielding gas to the hinge base.

8. The micro-nano impact indentation testing device based on cyclic refrigeration according to claim 1, wherein the sliding table is an up-and-down single-degree-of-freedom sliding member.

9. A micro-nano impact indentation testing method based on cyclic refrigeration, adopting the device according to claim 1 for testing, and comprising the following steps:
   step S1: assembling a refrigeration pipeline according to the above device, fixing a to-be-tested sample on a stage, mounting a diamond indenter on a pressure rod, and adjusting the stage and the pressure rod to enable the diamond indenter to correspond to a position of the to-be-tested sample;
   step S2: clamping a cold conduction wire in a limiting hanging buckle of a refrigeration balancer, keeping the cold conduction wire in contact with a cold conduction plate, filling a phase change material with a corresponding experiment temperature in a cold storage container according to an experiment requirement, and performing cold storage on the phase change material at the experiment temperature in advance;
   step S3: outputting a shielding gas through a shielding gas channel, setting an infrared thermal imaging assembly and a camera assembly to be in a working state, starting a refrigeration device to perform cyclic refrigeration on the indenter and the stage until the indenter and the stage are at an experimental temperature, and arranging the cold storage container filled with a phase change material subjected to cold storage in advance in the refrigeration balancer; and
   step S4: after observing that the indenter and the stage are stable at the experimental temperature, controlling a drive platform, a piezoelectric stack and other assemblies to perform low-temperature impact indentation experiment and collecting relevant data from the impact indentation experiment.

* * * * *